E. PIGGOTT.
HAND CULTIVATOR.
APPLICATION FILED JUNE 25, 1909.
957,573.
Patented May 10, 1910.
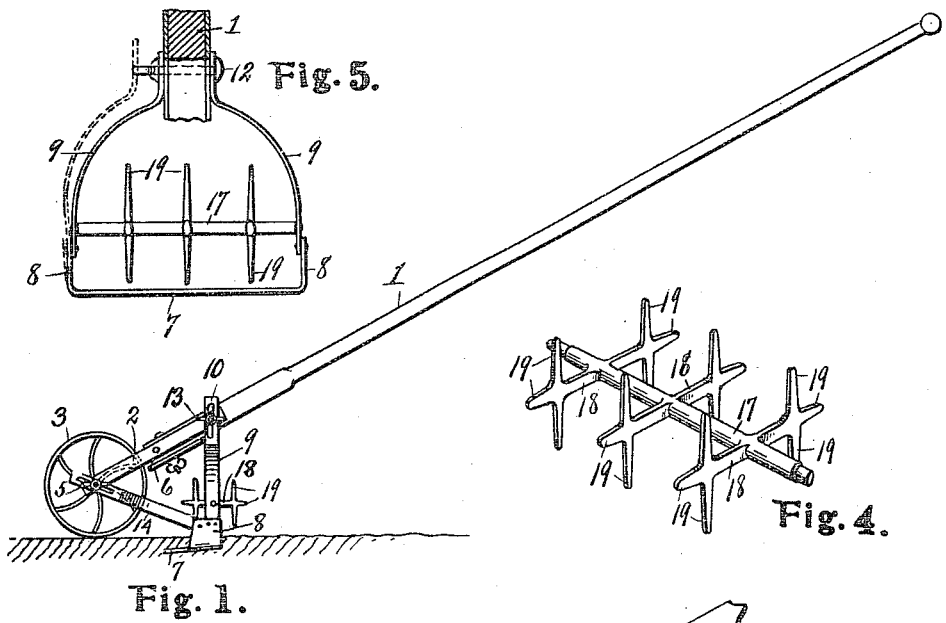
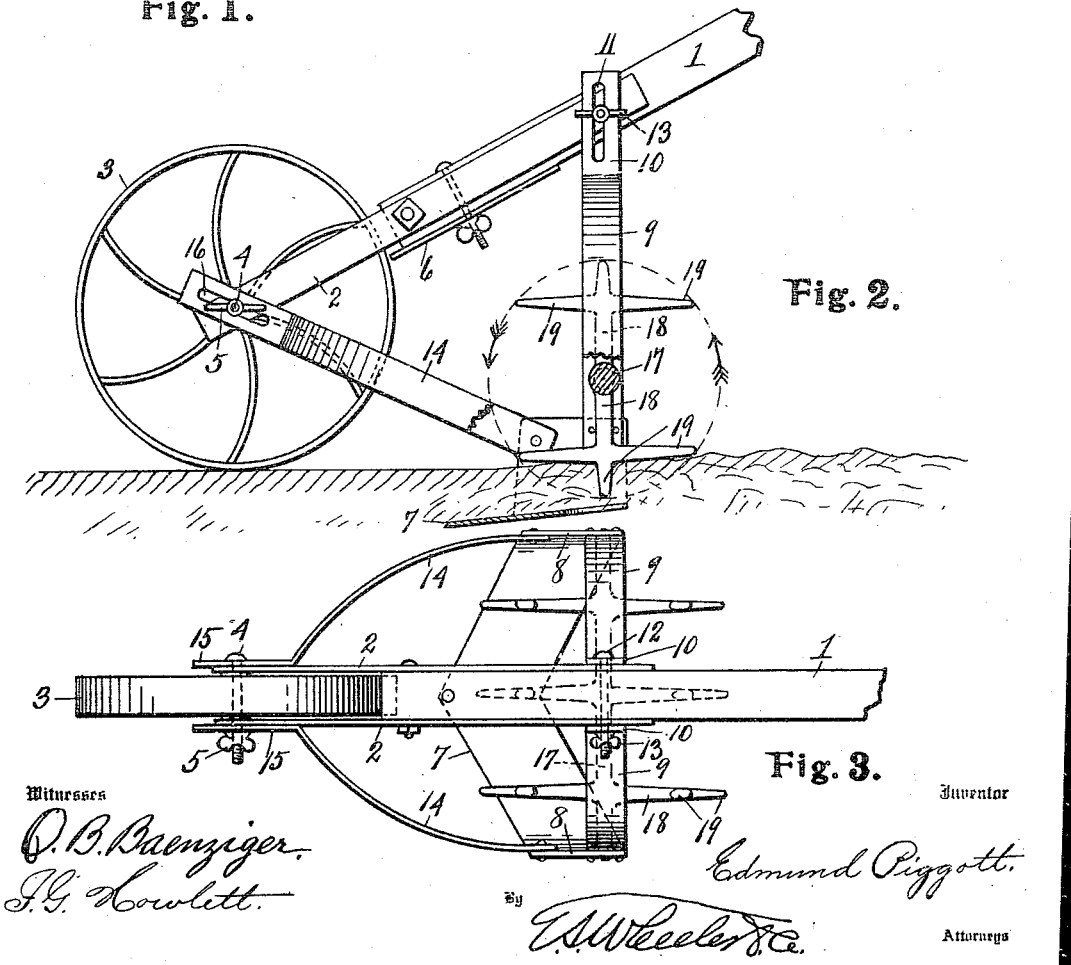

UNITED STATES PATENT OFFICE.

EDMUND PIGGOTT, OF DETROIT, MICHIGAN.

HAND-CULTIVATOR.

957,573.

Specification of Letters Patent. Patented May 10, 1910.

Application filed June 25, 1909. Serial No. 504,231.

*To all whom it may concern:*

Be it known that I, EDMUND PIGGOTT, a citizen of the Dominion of Canada, residing at Detroit, in the county of Wayne, State of Michigan, have invented certain new and useful Improvements in Hand-Cultivators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a hand cultivator, especially designed for garden work, and consists in the construction and arrangement of parts hereinafter more fully set forth and pointed out particularly in the claims.

The object of the invention is to provide simple and efficient means in connection with an implement of the character described, for breaking up the crust on the surface of the ground over the blade as the implement is pushed over the surface of the ground in advance of the operator, whereby the ground is more thoroughly loosened and broken, provision being made whereby the arms of the ground breaker are caused to revolve by contact with the soil while the implement is in motion.

The above object is attained by the device illustrated in the accompanying drawings, in which:—

Figure 1 is an elevation of a hand cultivator involving my invention, showing the blade in the ground, as when in use. Fig. 2 is an enlarged view of the lower end of the cultivator, parts being broken away showing the blade in the ground and one of the positions of the rotary breaking arms when the implement is in use. Fig. 3 is a plan view of the parts shown in Fig. 2. Fig. 4 is a perspective view of the ground breaking arms and shaft upon which they are mounted. Fig. 5 is a rear elevation with the handle in section, showing the manner in which the ground breaking arms may be removed should they become clogged with grass or weeds.

Referring to the characters of reference, 1 designates the handle of the implement which at its lower end is provided with a fork 2 between the sides of which the transporting wheel 3 is journaled on a bolt 4, which at one end is threaded to receive a thumb nut 5. Secured to the under side of the handle is an adjustable scraper 6 to prevent the accumulation of dirt on the periphery of the wheel.

The blade 7 is preferably V-shaped in form and is provided with upwardly turned terminals 8 rigidly secured to the lower end of the curved hangers 9. These hangers are provided with straight portions 10 at their upper ends having slots 11 therein through which passes the bolt 12, said bolt also passing through the handle and receiving on its threaded end a thumb nut 13. By means of the slots 11 through the upper end of said hangers through which the bolt 12 passes, the height of the blade may be adjusted at will, thereby regulating the depth which it shall enter the ground.

To assist the hangers 9 in rigidly supporting the blade, the curved braces 14 are employed whose rear ends are rigidly secured to the upwardly turned terminals 8 of the blade and which extend upwardly and forwardly and curve inwardly, the forward ends of said braces having the straight portions 15 provided with the longitudinal slots 16 through which passes the axle bolt 4. This arrangement provides for swinging the blade 7 to change the angle thereof, by loosening the nut 5 and adjusting the braces 14 longitudinally.

Crossing transversely between the hangers 9 and journaled therein above the ends of the blade is a shaft 17 having thereon the radial arms 18 provided at their extremities with the tapered points 19 adapted to enter the ground and cause a rotation of said shaft as the implement moves forward in the operation of cultivating. The ground over the blade is slightly lifted thereby as the blade enters it and caused to engage the points of the arms which in revolving strike and pierce the soil which passes over the blade, thereby breaking up the crust and loosening the earth, a result of very material advantage in gardening. This operation of working the soil concurrent with the passage of the cultivating blade therethrough, obviates the necessity of devoting additional time and labor to such work.

Should it be desired, for any reason, to remove the earth-breaking arms, said arms may be readily removed by unscrewing the thumb nut 13 from the end of the bolt 12 and springing outwardly one of the hangers 9, whereby the shaft 17 carrying said arms may be withdrawn. This operation is clearly illustrated by dotted lines in Fig. 5.

Having thus fully set forth my invention, what I claim as new and desire to secure by Letters Patent, is:—

1. In a hand cultivator, a handle, hangers depending therefrom, a cultivating blade supported by the lower ends of said hangers, and pointed earth-breaking arms journaled between said hangers directly over said blade to swing into close proximity thereto.

2. A hand cultivator, comprising a handle, curved hangers adjustably attached to said handle, a cultivating blade connected to the lower ends of said hangers, a shaft journaled between said hangers, and pointed arms on said shaft positioned to enter the earth directly over said blade.

3. In a hand cultivator, a handle, a transporting wheel mounted thereon, a cultivating blade, hangers depending from the handle and supporting said blade, braces adjustably connecting the blade with the axle of the wheel, a shaft journaled between said hangers, and radial arms on said shaft positioned to pierce the earth directly over said blade.

In testimony whereof, I sign this specification in the presence of two witnesses.

EDMUND PIGGOTT.

Witnesses:
E. S. WHEELER,
I. G. HOWLETT.